(12) United States Patent
Kuusela

(10) Patent No.: US 10,499,078 B1
(45) Date of Patent: Dec. 3, 2019

(54) IMPLICIT MOTION COMPENSATION FILTER SELECTION

(71) Applicant: GOOGLE LLC, Mountain View, CA (US)

(72) Inventor: Aki Kuusela, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/426,481

(22) Filed: Feb. 7, 2017

(51) Int. Cl.
| | |
|---|---|
| H04N 19/523 | (2014.01) |
| H04N 19/80 | (2014.01) |
| H04N 19/105 | (2014.01) |
| H04N 19/182 | (2014.01) |
| H04N 19/176 | (2014.01) |
| H04N 19/184 | (2014.01) |

(52) U.S. Cl.
CPC ......... *H04N 19/523* (2014.11); *H04N 19/105* (2014.11); *H04N 19/80* (2014.11); *H04N 19/176* (2014.11); *H04N 19/182* (2014.11); *H04N 19/184* (2014.11)

(58) Field of Classification Search
CPC .... H04N 19/523; H04N 19/105; H04N 19/80; H04N 19/176; H04N 19/182; H04N 19/184
USPC ..................................................... 375/240.17
See application file for complete search history.

(56) References Cited

U.S. PATENT DOCUMENTS

| | | | |
|---|---|---|---|
| 5,488,419 A | 1/1996 | Hui et al. | |
| 5,623,313 A | 4/1997 | Naveen | |
| 6,639,944 B1 | 10/2003 | De Haan et al. | |
| 6,950,469 B2 | 9/2005 | Karczewicz et al. | |
| 7,349,473 B2 | 3/2008 | Hallapuro et al. | |
| 8,290,054 B2* | 10/2012 | Ameres | H04N 7/50 375/240.16 |
| 9,118,933 B1* | 8/2015 | Alshin | H04N 19/86 |
| 9,319,711 B2* | 4/2016 | Minoo | H04N 19/577 |
| 2003/0202607 A1* | 10/2003 | Srinivasan | H04N 19/61 375/240.29 |
| 2009/0257493 A1* | 10/2009 | Ye | H04N 7/364 375/240.12 |

(Continued)

OTHER PUBLICATIONS

Grange et al. "VP9 Bitstream & Decoding Process Specification", Version 0.6, Mar. 31, 2016.*

(Continued)

*Primary Examiner* — James T Boylan
(74) *Attorney, Agent, or Firm* — Young Basile Hanlon & MacFarlane, P.C.

(57) ABSTRACT

A method and apparatus for motion prediction of a block of pixels are provided. The method includes determining respective sub-pixel interpolation filters for pixel positions of a reference block for the block of pixels and generating a prediction block of prediction pixels using the reference block and the respective sub-pixel interpolation filters. The apparatus includes a memory and a processor configured to execute instructions stored in the memory to determine respective sub-pixel interpolation filters for pixel positions of a reference block for the block of pixels and generate a prediction block of prediction pixels using the reference block and the respective sub-pixel interpolation filters. Each sub-pixel interpolation filter for a pixel position is determined using at least one characteristic of a set of pixels of the reference block about the pixel position.

14 Claims, 10 Drawing Sheets

(56) References Cited

U.S. PATENT DOCUMENTS

| | | | | |
|---|---|---|---|---|
| 2010/0111182 | A1* | 5/2010 | Karczewicz | H04N 19/147 375/240.16 |
| 2011/0007802 | A1* | 1/2011 | Karczewicz | H04N 19/105 375/240.15 |
| 2017/0085913 | A1* | 3/2017 | Chen | H04N 19/523 |

OTHER PUBLICATIONS

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Grange, Adrian et al.; "VP9 Bitstream & Decoding Process Specification"; Version 0.6; Mar. 31, 2016; pp. 1-165.

\* cited by examiner

US 10,499,078 B1

IMPLICIT MOTION COMPENSATION FILTER SELECTION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on motion estimation and compensation may be performed by breaking frames or images into blocks which are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

The disclosure relates in general to video coding, and in particular to implicit motion compensation filter selection.

One aspect of the disclosed implementations is a method for motion prediction of a block of pixels. The method includes determining respective sub-pixel interpolation filters for pixel positions of a reference block for the block of pixels and generating a prediction block of prediction pixels using the reference block and the respective sub-pixel interpolation filters. Each sub-pixel interpolation filter for a pixel position is determined using at least one characteristic of a set of pixels of the reference block about the pixel position.

An apparatus for motion prediction of a block of pixels according to one implementation of this disclosure includes a memory and a processor configured to execute instructions stored in the memory to determine respective sub-pixel interpolation filters for pixel positions of a reference block for the block of pixels and generate a prediction block of prediction pixels using the reference block and the respective sub-pixel interpolation filters. Each sub-pixel interpolation filter for a pixel position is determined using at least one characteristic of a set of pixels of the reference block about the pixel position.

An apparatus for decoding using motion prediction of a block of pixels according to another implementation of this disclosure includes a memory and a processor configured to execute instructions stored in the memory to decode a block interpolation filter type for the block from an encoded bitstream and, in response to determining that the block interpolation filter type is an implicit interpolation filter type, determine respective sub-pixel interpolation filters for pixel positions of a reference block for the block of pixels and generate a prediction block of prediction pixels using the reference block and the respective sub-pixel interpolation filters. Each sub-pixel interpolation filter for a pixel position is determined using at least one characteristic of a set of pixels of the reference block about the pixel position.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
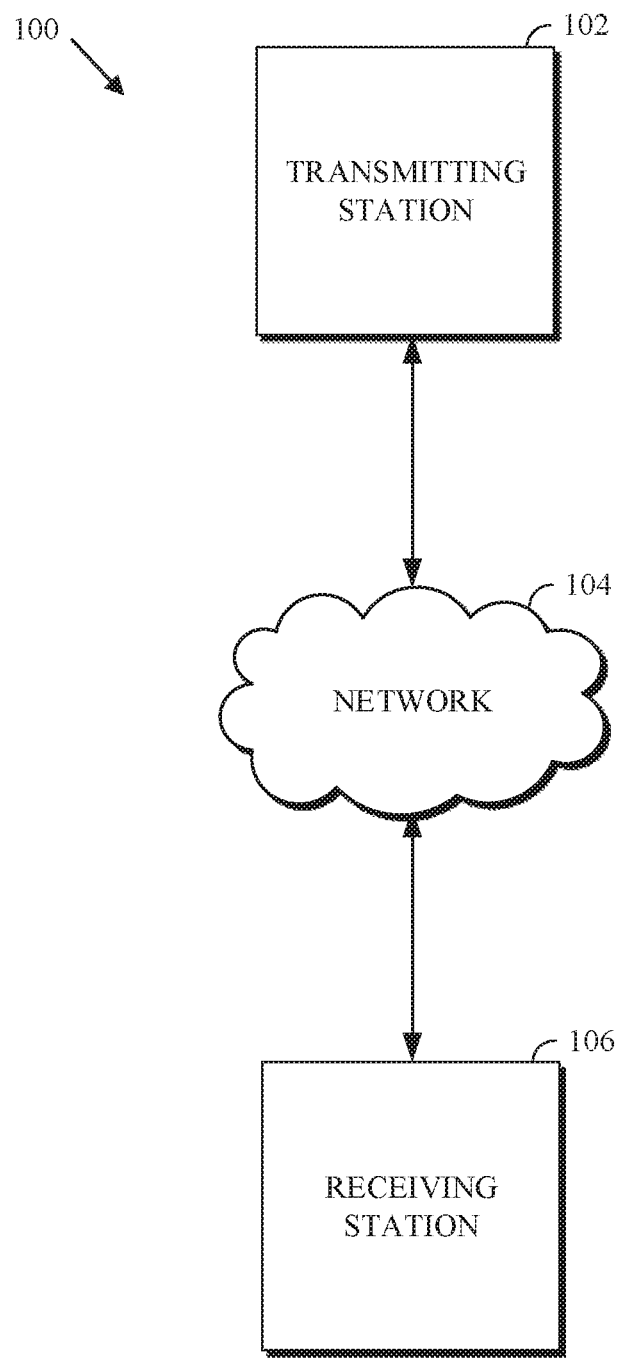
FIG. 1 is a schematic of a video encoding and decoding system.

As mentioned above, compression schemes related to coding video streams may include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously-coded pixel values and those in the current block. In this way, only the residual and parameters used to generate it need be added to the bitstream instead of including the entirety of the current block. This technique may be referred to as inter-prediction. The residual may be encoded using a lossy quantization step. Decoding (i.e., reconstructing) an encoded block from such a residual often results in a distortion between the original and the reconstructed block.

One of the parameters in inter-prediction is a motion vector that represents the spatial displacement of the previously coded block relative to the current block. The motion vector can be identified using a method of motion estimation, such as a motion search. In the motion search, a portion of a reference frame can be translated to a succession of locations to form a prediction block that can be subtracted from a portion of a current frame to form a series of residuals. The horizontal and/or vertical translations corresponding to the location having, e.g., the smallest, residual can be selected as the motion vector. Bits representing the motion vector can be included in the encoded bitstream to permit a decoder to reproduce the prediction block and decode the portion of the encoded video bitstream associated with the motion vector.

In some situations, the prediction block that results in the best residual may not correspond with pixels in the reference frame. That is, the best motion vector may point to a location that is between pixels of blocks in the reference frame. In this case, motion compensated prediction at the sub-pixel level is useful. Motion compensated prediction may involve the use of a sub-pixel interpolation filter that generates filtered sub-pixel values at defined locations between the full pixels (also called integer pixels) along rows, columns, or both. The interpolation filter may be one of a number of interpolation filters available for use in motion compensated prediction, where each of the interpolation filters has a different frequency profile.

Some video formats use different interpolation filters. For example, VP9 uses four interpolation filters: a smooth filter, a normal filter, a sharp filter, and a bilinear filter. The interpolation filter to be used by a decoder to generate a prediction block may be signaled, in the encoded bitstream, in the header of the frame containing the block to be predicted. As such, the same interpolation filter is used to generate sub-pixel prediction blocks for all blocks of the frame. The interpolation filter may also be signaled at a coding unit level. As such, the same interpolation filter is used for every block (e.g., every prediction block) of the coding unit to generate sub-pixel prediction blocks for the blocks of the coding unit. A coding unit may be a 64×64 pixel block of a video frame and can be further partitioned into smaller blocks. An encoder may generate a prediction block based on each of the available interpolation filters. The encoder then selects (i.e., to signal to the decoder) the filter that results in, e.g., the best rate-distortion ratio. A rate-distortion ratio refers to a ratio that balances an amount of distortion (i.e., loss in video quality) with rate (i.e., the number of bits) required for encoding.

Switching (i.e., signaling) interpolation filters at a smaller granularity (e.g., coding unit instead of frame) can result in lower residual errors (i.e., better predictions). That is, predictions may be improved as the granularity of switching of the interpolation pixel decreases. However, switching the interpolation filter more often than at the frame level requires more signaling of the change in interpolation filter in the encoded bitstream. More signaling in turn means more bits are required to be added to the bitstream which in turn decreases the compression level. Therefore, techniques for selecting interpolation filters at small granularity levels (e.g., at the pixel level) while not increasing the signaling overhead are desirable.

In implementations of this disclosure, compression performance may be improved by implicitly determining a sub-pixel interpolation filter for each sub-pixel of the prediction block instead of applying a same sub-pixel interpolation filter, such as one specified for the frame, to each sub-pixel of the prediction block. Implicitly determining an interpolation filter means that a decoder can determine, without signaling by an encoder in a bitstream, an interpolation filter to apply. That is, the switching of interpolation filters at the pixel level, thereby enabling optimal interpolation filter selection at the pixel level, can be achieved without additional overhead (i.e., extra signaling bits in the bitstream). Other details are described herein after first describing an environment in which the disclosure may be implemented.

Implicit motion compensation filter selection is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
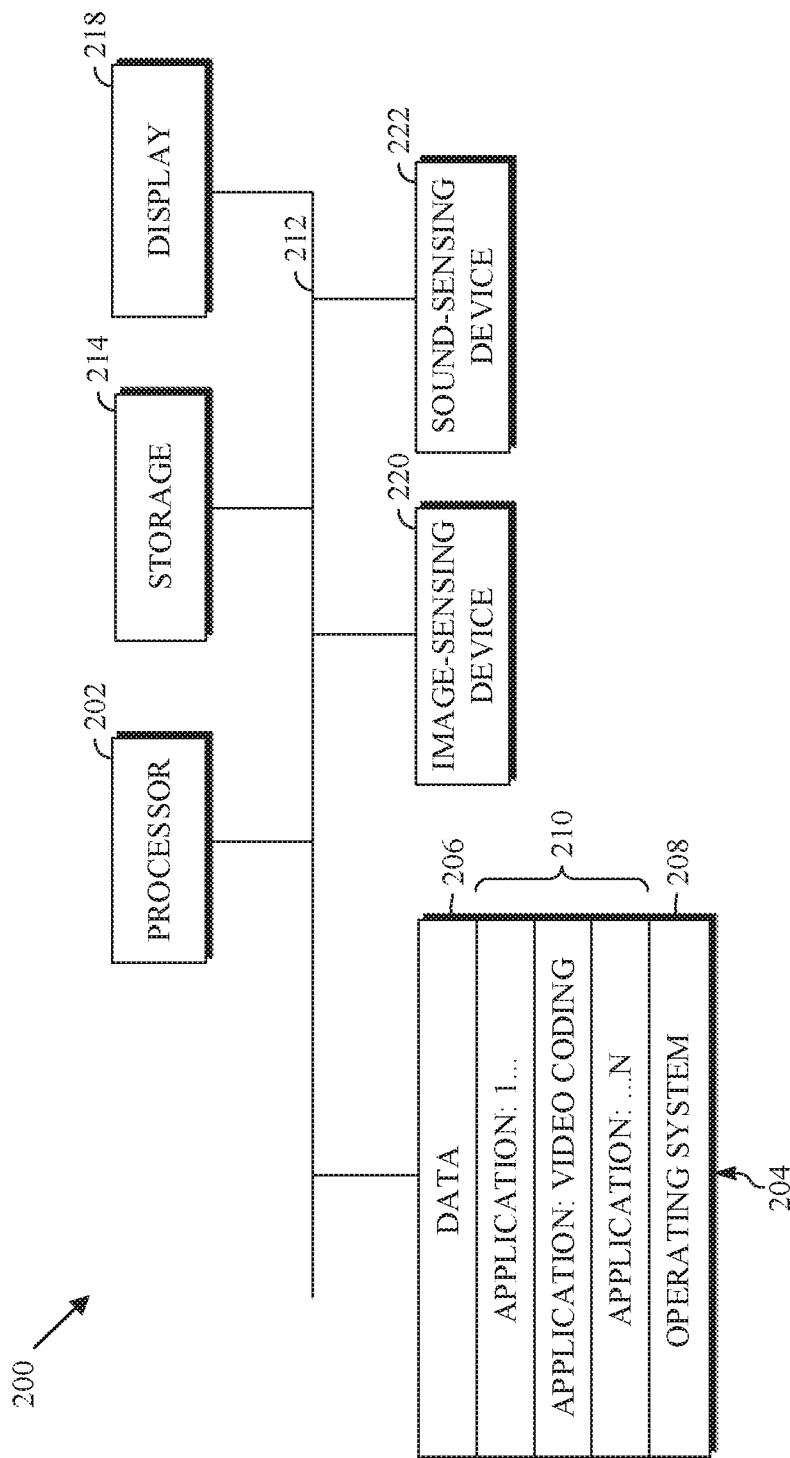
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
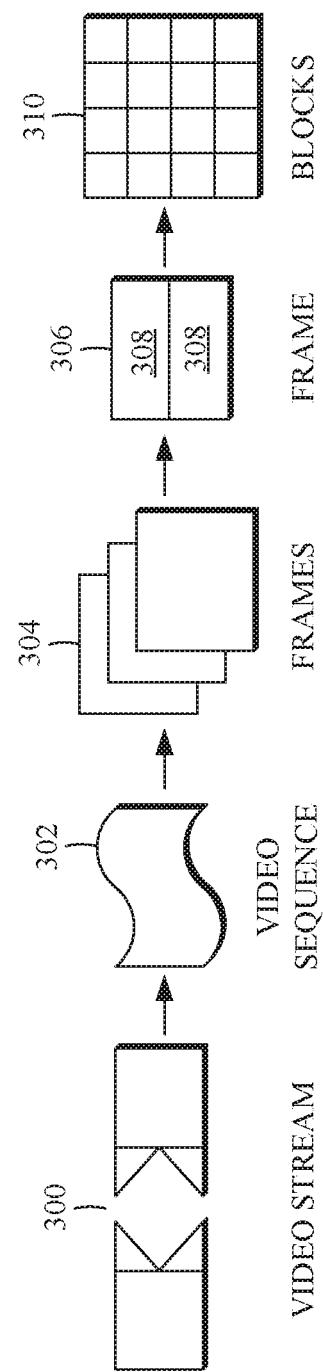
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
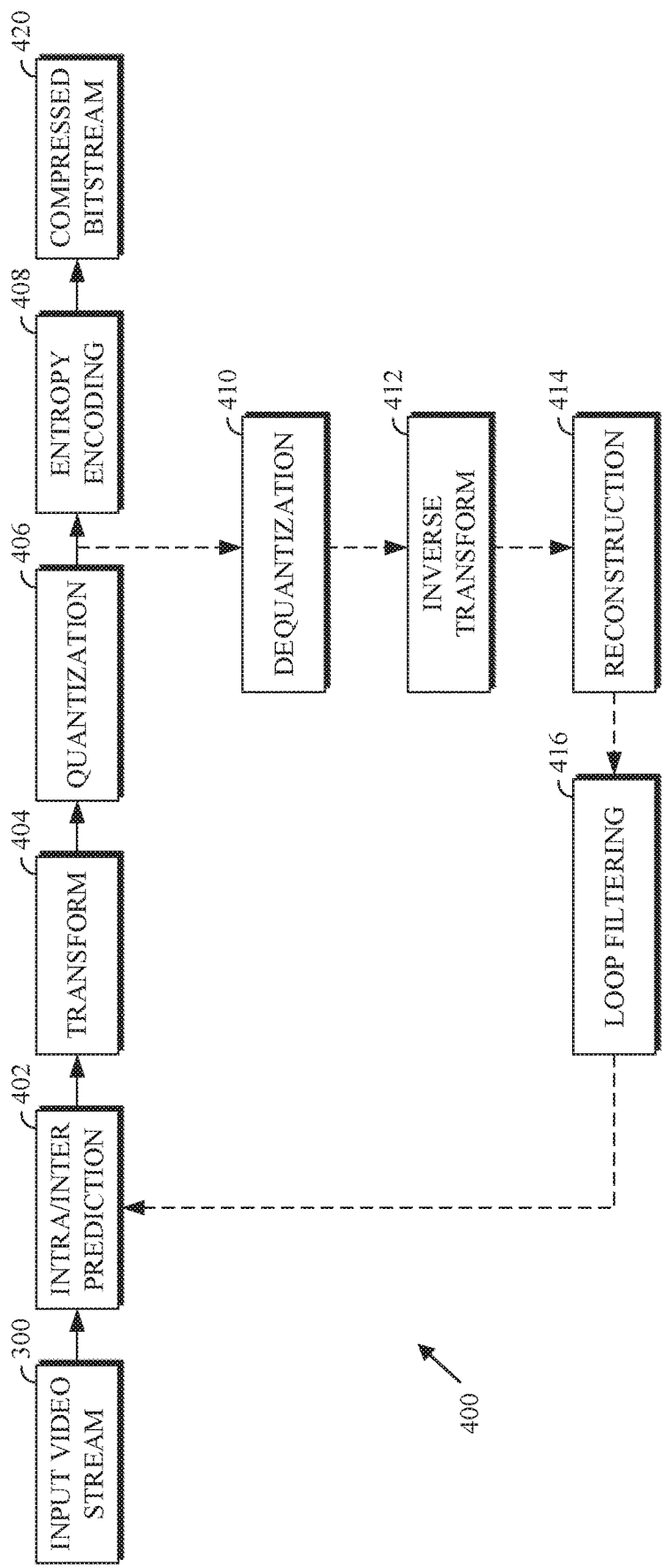
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
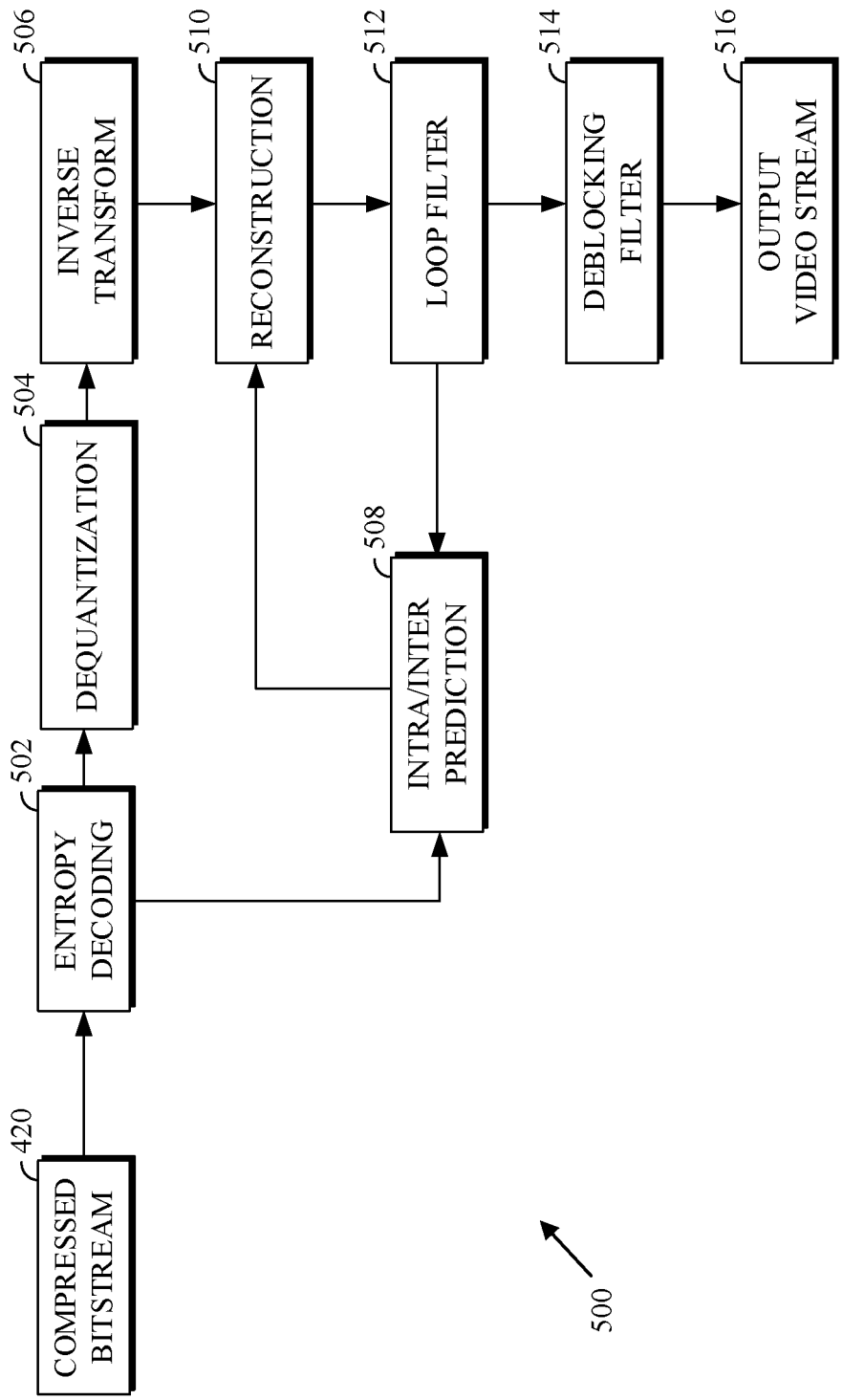
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIGS. 6 and 10 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
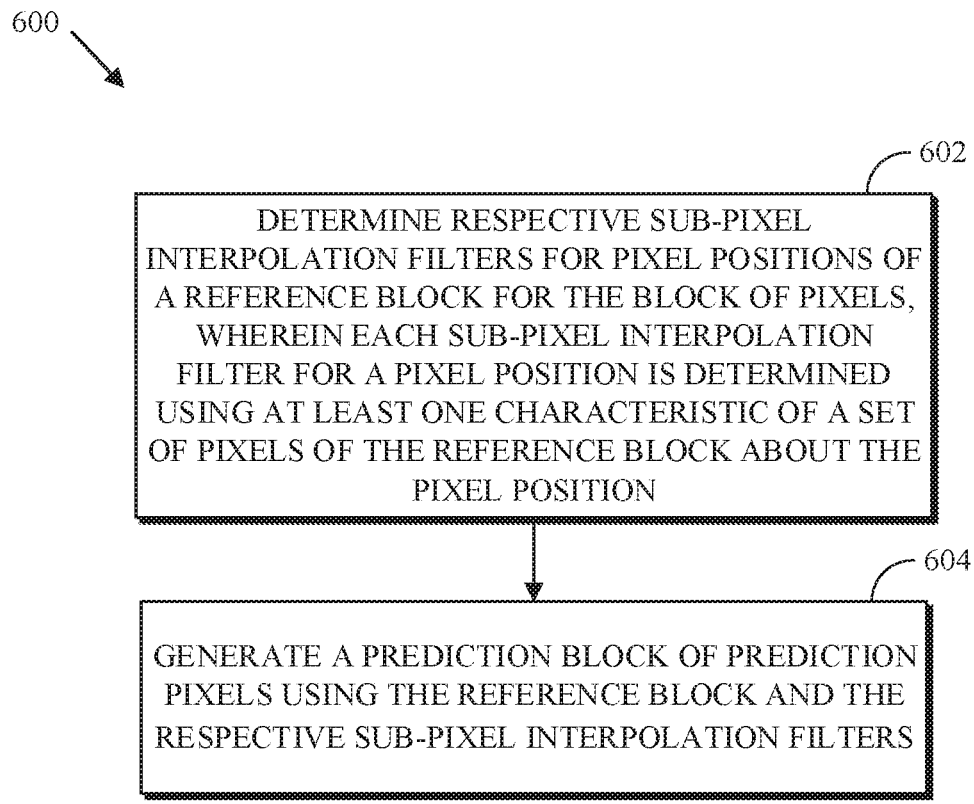
FIG. 6 is a flowchart diagram of a process for motion prediction of a block of pixels according to an implementation of this disclosure.

FIG. 6 is a flowchart diagram of a process 600 for motion prediction of a block of pixels according to an implementation of this disclosure. The process 600 can be implemented in an encoder such as the encoder 400 or a decoder such as the decoder 500.

The process 600 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the intra/inter prediction stage 402 of the encoder 400. In at least some implementations, the process can be performed in whole or in part by the intra/inter-prediction stage 508 of the decoder 500.

The process 600 may be performed by a decoder such as the decoder 500. For example, the process 600 can be performed in whole or in part by the intra/inter-prediction stage 508 of the decoder 500. Implementations of the process 600 can be performed by storing instructions in a memory such as the memory 204 of the receiving station 106 to be executed by a processor such as CPU 202, for example.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 600 generates a prediction block of prediction pixels based on determined sub-pixel interpolation filters for pixel positions of a reference block. The reference block can be a reference block of a previously constructed reference frame determined using motion vectors as described with respect to the intra/inter prediction stage 402 of FIG. 4 or the intra/inter-prediction stage 508 of FIG. 5. The prediction block is a prediction block formed based on sub-pixel motion. Sub-pixel motion is described below with reference to FIGS. 7A-7B.

The value of a pixel in the prediction block is derived by applying a sub-pixel interpolation filter to some pixels of the reference block. A sub-pixel interpolation filter is illustrated below with respect to FIG. 8. The sub-pixel interpolation filter used to generate a pixel value for a position of the prediction block is not determined a priori (i.e., before performing the interpolation operation). Rather, the process 600 determines, for each pixel position of the prediction block, and at interpolation time, which interpolation filter to apply.

At 602, the process 600 determines respective sub-pixel interpolation filters for pixel positions a reference block for the block of pixels. Each sub-pixel interpolation filter for a pixel position is determined using at least one characteristic of a set of pixels of the reference block about the pixel position. That is, the process 600 determines, for each pixel position of some of the pixel positions of the prediction block, which sub-pixel interpolation filter to apply. The process 600 determines a sub-pixel interpolation filter for a pixel position based on at least one characteristic of a set of pixels about the pixel position. The pixels about the pixel position can be neighboring pixels to the pixel position in the reference block. An example of a set of neighboring pixels is described below with respect to FIG. 8.

At 604, the process 600 generates a prediction block of prediction pixels using the reference block and the respective sub-pixel interpolation filters.

In some implementations, the process 600 determines a sub-pixel interpolation filter from a set of predefined or available sub-pixel interpolation filter types. The predefined sub-pixel interpolation filter types can include the interpolation filters described with respect to FIG. 8 namely the smooth interpolation filter (EIGHTTAP_SMOOTH), the sharp interpolation filter (EIGHTTAP_SHARP), the normal interpolation filter (EIGHTTAP), and the bilinear interpolation filter (Bi-linear).

In some implementations, the process 600 includes determining a first error for the prediction block, determining a second error for a second prediction block prediction block, and selecting a block interpolation filter type corresponding to a lower prediction error of the first prediction error and the second prediction error. The second prediction block can be generated using one interpolation filter of the set of predefined sub-pixel interpolation filter types for all pixels of the reference block. The block interpolation filter type indicates the one interpolation filter of the set of predefined sub-pixel interpolation filter types or an implicit interpolation filter type. Determining an error and selecting the block interpolation filter type are further described below with reference to FIG. 9.

In some implementations, the process 600 includes determining a prediction error for the prediction block, generating a plurality of prediction blocks for the current block using the reference block, determining respective prediction errors for each of the plurality of prediction blocks, and selecting an interpolation filter type based on the prediction error for the prediction block and the respective prediction errors for each of the plurality of prediction blocks. For each of the plurality of prediction blocks, the process 600 can use a different, single sub-pixel interpolation filter for each pixel position of the reference block. That is, for one prediction block of the plurality of prediction blocks, the process 600 uses the same sub-pixel interpolation filter for all pixel positions of the reference block. The process 600 can select an implicit interpolation filter when the prediction error for the prediction block is smaller than the respective prediction errors for each of the plurality of prediction blocks.

The process 600 can also include encoding, for the block and in an encoded bitstream, a block interpolation filter type indicating one of the set of predefined sub-pixel interpolation filter types or an implicit interpolation filter type. For example, the process 600 can signal to a decoder a default interpolation filter type that the decoder can use for the block. The signal can be part of the frame header or part of a coding block header.

In some implementations, the process 600 can include selecting the set of pixels about the pixel position based on a cardinality of taps of each sub-pixel interpolation filter. The set of pixels of the reference block about the pixel position to be interpolated is the set of pixels to be used by the interpolation filter. For example, referring to FIG. 8 and assuming that the pixel position 822 corresponds to a pixel position of the prediction block, when determining the interpolation pixel for the pixel at pixel position 822, pixels 800, 802, 804, 806, 808, 810 can constitute the set of pixels of the reference block about the pixel position. The set of pixels about the pixel can comprise the eight pixels of an 8-tap interpolation filter described above.

In some implementations, the characteristic is a range of values of the set of pixels. The characteristic can also be the variance, standard deviation, a Sobel filter, or other metrics related to the set of pixels. The process 600 can determine the sub-pixel interpolation filter for a pixel position based on the value of the metric related to the set of neighboring pixels. For example, a different interpolation filter can be determined depending on the value of the metric. In an implementation, the value of the metric can be compared to one or more threshold values to determine the sub-pixel interpolation filter to apply for the pixel position of the prediction block.

By way of illustration only, and assuming that the process 600 uses the range of values of the set of pixels as the metric, then the process 600 can implement the following process for determining the interpolation filter for a pixel position.

range=max(set of pixels)−min(set of pixels)
    if (range<NormalThreshold)
    filter_type=Smooth Interpolation Filter
    else if (range<SharpThreshold)
    filter_type=Normal Interpolation Filter
    else
    filter_type=Sharp Interpolation Filter The value of the range is first determined. The range is the difference between the largest pixel value and the smallest pixel value of the set of pixels. If the range is less than a NormalThreshold value, then process 600 selects the smooth interpolation filter. If the range is greater than or equal NormalThreshold but less than SharpThreshold, then the process 600 selects the normal interpolation filter. Otherwise, if the range exceeds the SharpThreshold value, the process 600 selects the sharp interpolation filter. The NormalThreshold and SharpThreshold threshold values may be empirically derived.

In an implementation, the characteristic can be a frequency domain characteristic that is based on a frequency domain transformation of the set of pixels about the pixel. A frequency domain transformation can be used instead of, for example, determining a metric related to the set of pixels. For example, a Hadamard transform can be applied to the pixels of the set of neighboring pixels and an interpolation filter is then selected based on the resulting frequency coefficients.

As described above, the reconstruction processes of an encoder and a decoder are identical and result in identical reconstructed frames. As the encoder and the decoder generate identical reconstructed frames (e.g., in the reconstruction stage 414 of FIG. 4 and the reconstruction phase 510 of FIG. 5), the encoder and the decoder have access to identical pixel values for their respective interpolation processes. As such, the encoder and the decoder chose the same interpolation filter type since the encoder and the decoder determine the same metric value from the identical pixel values. Therefore, the encoder need not signal, in the encoded bitstream, an interpolation filter type for each pixel.

As described above, an implicit interpolation filter type is determined for every pixel of the prediction block thereby increasing computational complexity. In some implementations, and to reduce the computational complexity, an implicit interpolation filter is determined for a block of any size, such as block sizes indicated for the blocks 310 of FIG. 3. For example, for an 8×8 block, a single sub-pixel interpolation filter is determined for all the pixels of the block based on a metric (e.g., range, standard deviation, variance, etc.) of the pixels of the block. The encoder can signal, in the encoded bitstream and in the header of the block, the sub-pixel interpolation filter for the block.

In an implementation, instead of pixel domain information (i.e., pixel values), the frequency domain information of the residual blocks may be used to determine which interpolation filter to use. The frequency domain information can be used in a motion compensation step of the inter/intra prediction stage. The frequency domain information of the residual is available in an encoder, such as the encoder 400 of FIG. 4, after a transform stage, such as the transform stage 404 of FIG. 4. The frequency domain information of the residual is available in a decoder, such as decoder 500, after a dequantization stage, such as the dequantization stage 504 of FIG. 5.

Figure 7A:
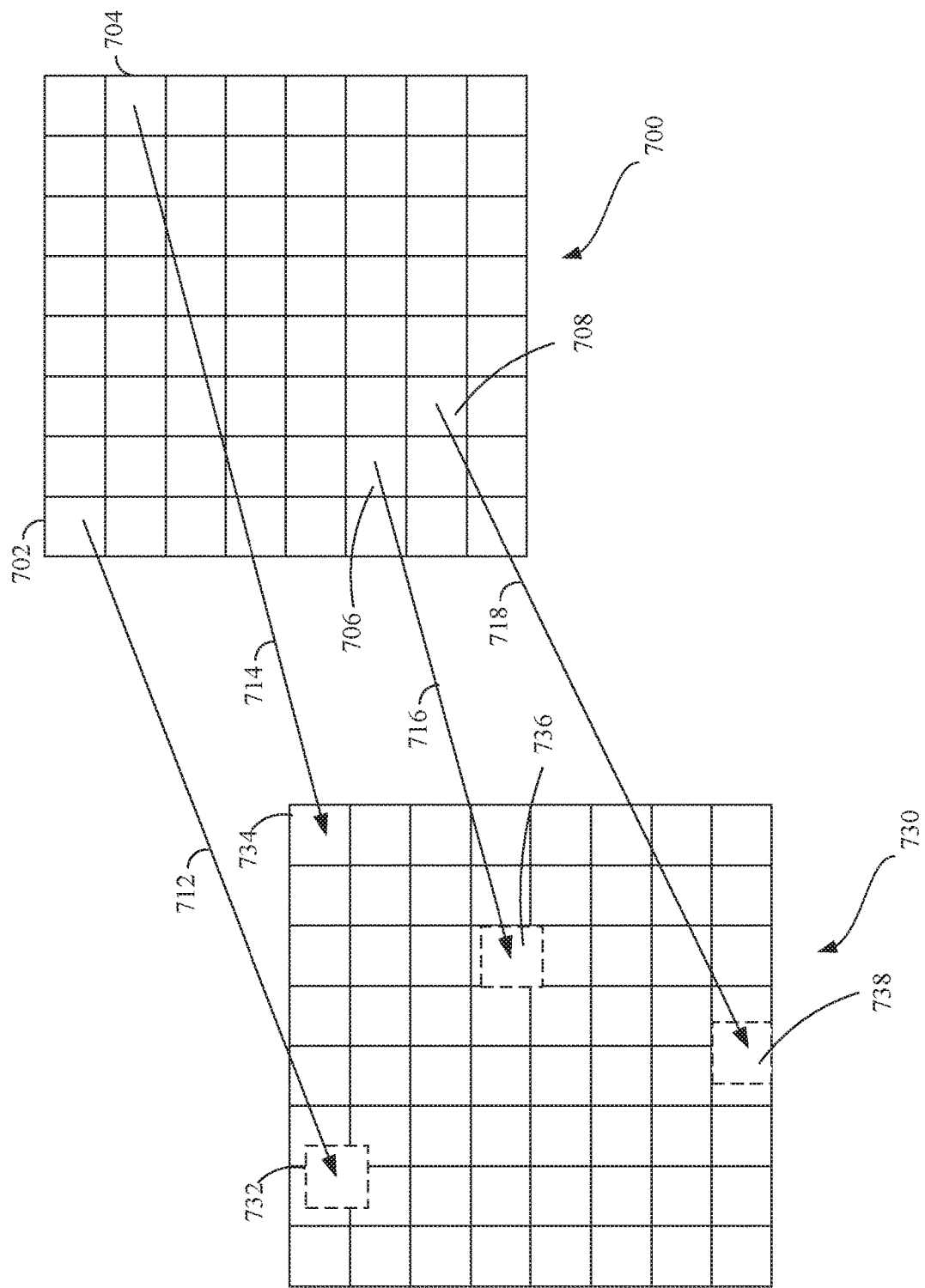
FIG. 7A is a diagram of motion vectors representing full and sub-pixel motion in accordance with implementations of this disclosure.

Sub-pixel motion is now explained with reference to FIGS. 7A-7B. FIG. 7A is a diagram of motion vectors representing full and sub-pixel motion in accordance with implementations of this disclosure, and FIG. 7B is a diagram of a sub-pixel prediction block according to an implementation of this disclosure.

In FIG. 7A, several blocks 702, 704, 706, 708 of a current frame 700 are inter-predicted using pixels from a reference frame 730. In this example, the reference frame 730 is a reference frame, also called the temporally adjacent frame, in a video sequence including the current frame 700, such as the video stream 300. The reference frame 730 is a reconstructed frame (i.e., one that has been encoded and decoded such as by the reconstruction path of FIG. 4) that has been stored in a so-called last reference frame buffer and is available for coding blocks of the current frame 700. Other (e.g., reconstructed) frames, or portions of such frames may also be available for inter-prediction. Other available reference frames may include a golden frame, which is another frame of the video sequence that may be selected (e.g., periodically) according to any number of techniques, and a constructed reference frame, which is a frame that is constructed from one or more other frames of the video sequence but is not shown as part of the decoded output, such as the output video stream 516 of FIG. 5.

A prediction block 732 for encoding the block 702 corresponds to a motion vector 712. A prediction block 734 for encoding the block 704 corresponds to a motion vector 714. A prediction block 736 for encoding the block 706 corresponds to a motion vector 716. Finally, a prediction block 738 for encoding the block 708 corresponds to a motion vector 718. Each of the blocks 702, 704, 706, 708 is inter-predicted using a single motion vector and hence a single reference frame in this example, but the teachings herein also apply to inter-prediction using more than one motion vector (such as bi-prediction using two different reference frames), where pixels from each prediction are combined in some manner to form a prediction block.

Figure 7B:
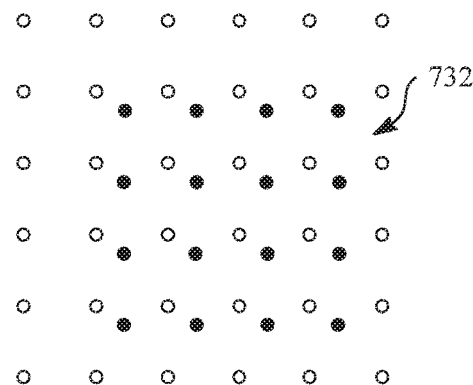
FIG. 7B is a diagram of a sub-pixel prediction block according to an implementation of this disclosure.

Referring now to FIG. 7B, integer pixels within the reference frame 730 are shown as unfilled circles. The integer pixels, in this example, represent reconstructed pixel values of the reference frame 730. The integer pixels are arranged in an array along x- and y-axes. Pixels forming the prediction block 732 are shown as filled circles. As can be seen from FIG. 7B, the prediction block 732 results from sub-pixel motion along two axes.

Generating the prediction block 732 can require two interpolation operations. A first interpolation operation to generate intermediate pixels followed by a second interpolation operation to generate the pixels of the prediction block from the intermediate pixels. The first and the second interpolation operations can be along the horizontal direction (i.e., along the x axis) and the vertical direction (i.e., along the y axis), respectively. Alternatively, the first and the second interpolation operations can be along the vertical direction (i.e., along the y axis) and the horizontal direction (i.e., along the x axis), respectively. The first and second interpolation operations can use a same interpolation filter type. Alternatively, the first and second interpolation operations can use different interpolation filter types.

In order to produce pixel values for the sub-pixels of the prediction block 732, an interpolation process may be used. In one example, the interpolation process is performed using interpolation filters such as finite impulse response (FIR) filters. An interpolation filter may comprise a 6-tap filter, an 8-tap filter, or other size filter. The taps of an interpolation filter weight spatially neighboring integer pixels with coefficient values to generate a sub-pixel value. In general, the interpolation filter used to generate each sub-pixel value at different sub-pixel positions between two integer pixels is different (i.e., has different coefficient values).

Figure 8:
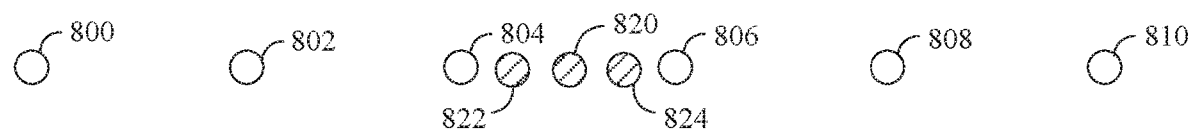
FIG. 8 is a diagram of full and sub-pixel positions according to an implementation of this disclosure.

FIG. 8 is a diagram of full and sub-pixel positions according to an implementation of this disclosure. In the example of FIG. 8, a 6-tap filter is used. This means that values for the sub-pixels or pixel positions 820, 822, 824 can be interpolated by applying an interpolation filter to the pixels 800-810. Only sub-pixel positions between the two pixels 804 and 806 are shown in FIG. 8. However, sub-pixel values between the other full pixels of the line of pixels can be determined in a like manner. For example, a sub-pixel value between the two pixels 806 and 808 may be determined or generated by applying an interpolation filter to the pixels 802, 804, 806, 808, 810, and an integer pixel adjacent to the pixel 810 if available.

Using different coefficient values in an interpolation filter, regardless of its size, will result in different characteristics of filtering and hence different compression performance. In some implementations, the set of interpolation filters may be designed for 1/16-pixel precision and include at least two of a Bi-linear filter, an 8-tap filter (EIGHTTAP), a sharp 8-tap filter (EIGHTTAP_SHARP), or a smooth 8-tap filter (EIGHTTAP_SMOOTH). Each interpolation filter has a different frequency response.

Figure 9:
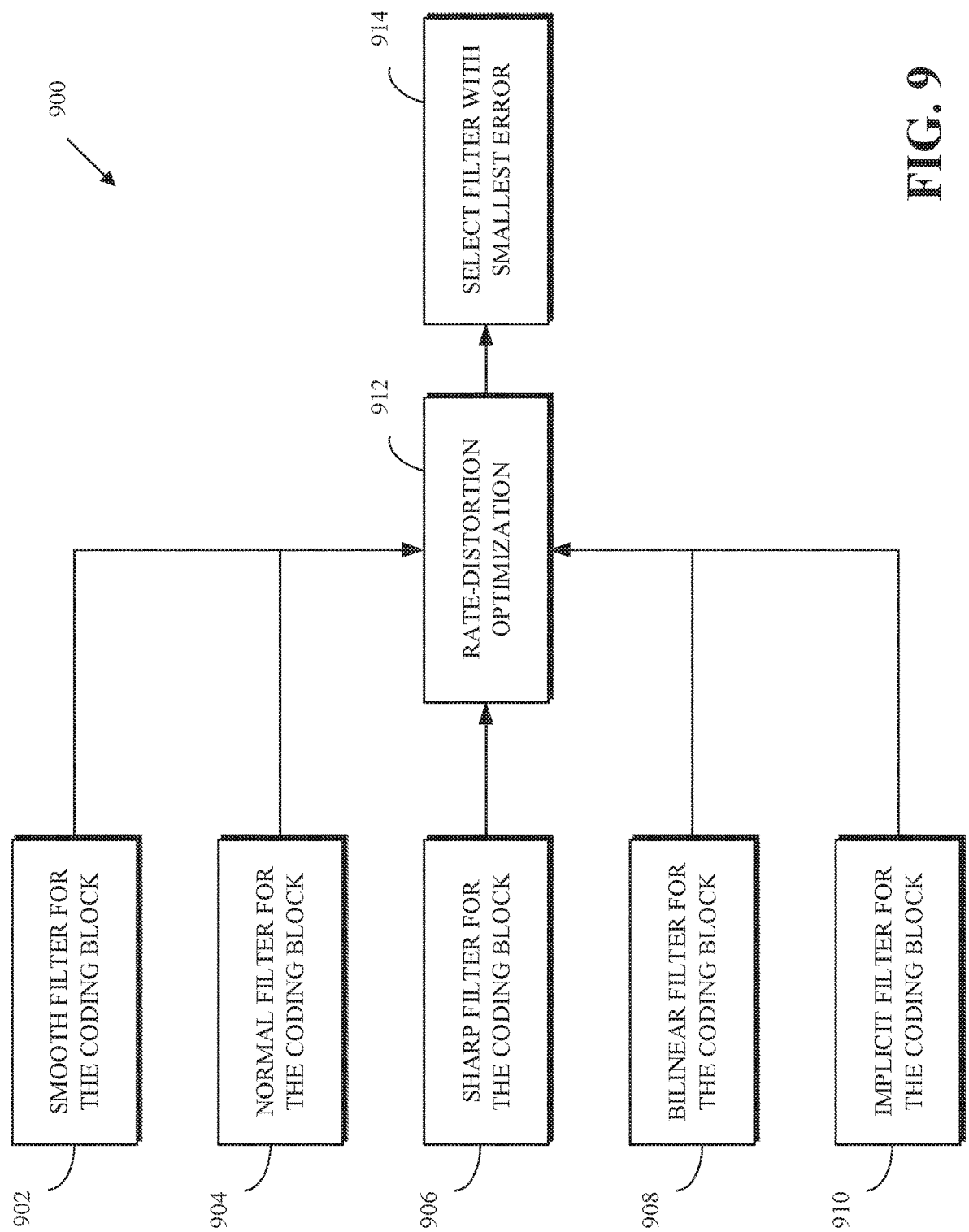
FIG. 9 is a flowchart diagram of a process for determining an error and selecting an interpolation filter at an encoder according to an implementation of this disclosure.

FIG. 9 is a flowchart diagram of a process 900 for determining an error and selecting an interpolation filter at an encoder according to an implementation of this disclosure. The process 900 can be used with or by the process 600. The process 900 selects an interpolation filter from among a set of interpolation filters, including an implicit interpolation filter type.

At step 902, the process 900 uses the smooth interpolation filter to generate each sub-pixel of a smooth prediction block. At step 912, and as part of a rate-distortion optimization process, an error associated with the smooth prediction block is determined. The error is determined between the block to be predicted (i.e., the source block) and the smooth prediction block. The error can be a mean squared error between co-located pixel values of the respective blocks. The error can be a sum of absolute differences error between co-located pixel values of the respective blocks. Any other suitable error measure can be used.

At step 904, the process 900 uses the normal interpolation filter to generate each sub-pixel of a normal prediction block. At step 912, an error associated with the normal prediction block is determined as described above. At step 906, the process 900 uses the sharp interpolation filter to generate each sub-pixel of a sharp prediction block. At step 912, an error associated with the sharp prediction block is determined.

At step 908, the process 900 uses the bilinear interpolation filter to generate each sub-pixel of a bilinear prediction block. At step 912, an error associated with the bilinear prediction block is determined. At step 910, the process 900 uses an implicit interpolation filter to generate each sub-pixel of a prediction block. An implicit interpolation filter is such that the process 900 determines and uses a different filter (for example, one selected from the smooth interpolation filter, the normal interpolation filter, the sharp interpolation filter, and the bilinear filter) for each pixel of the prediction block as described above with respect to the process 600. At step 912, an error associated with the implicit interpolation filter is determined. At step 914, the process 900 selects the interpolation filter corresponding to the smallest error. Alternatively, the process 900 selects the sub-pixel interpolation filter corresponding to the best rate-distortion ratio.

Figure 10:
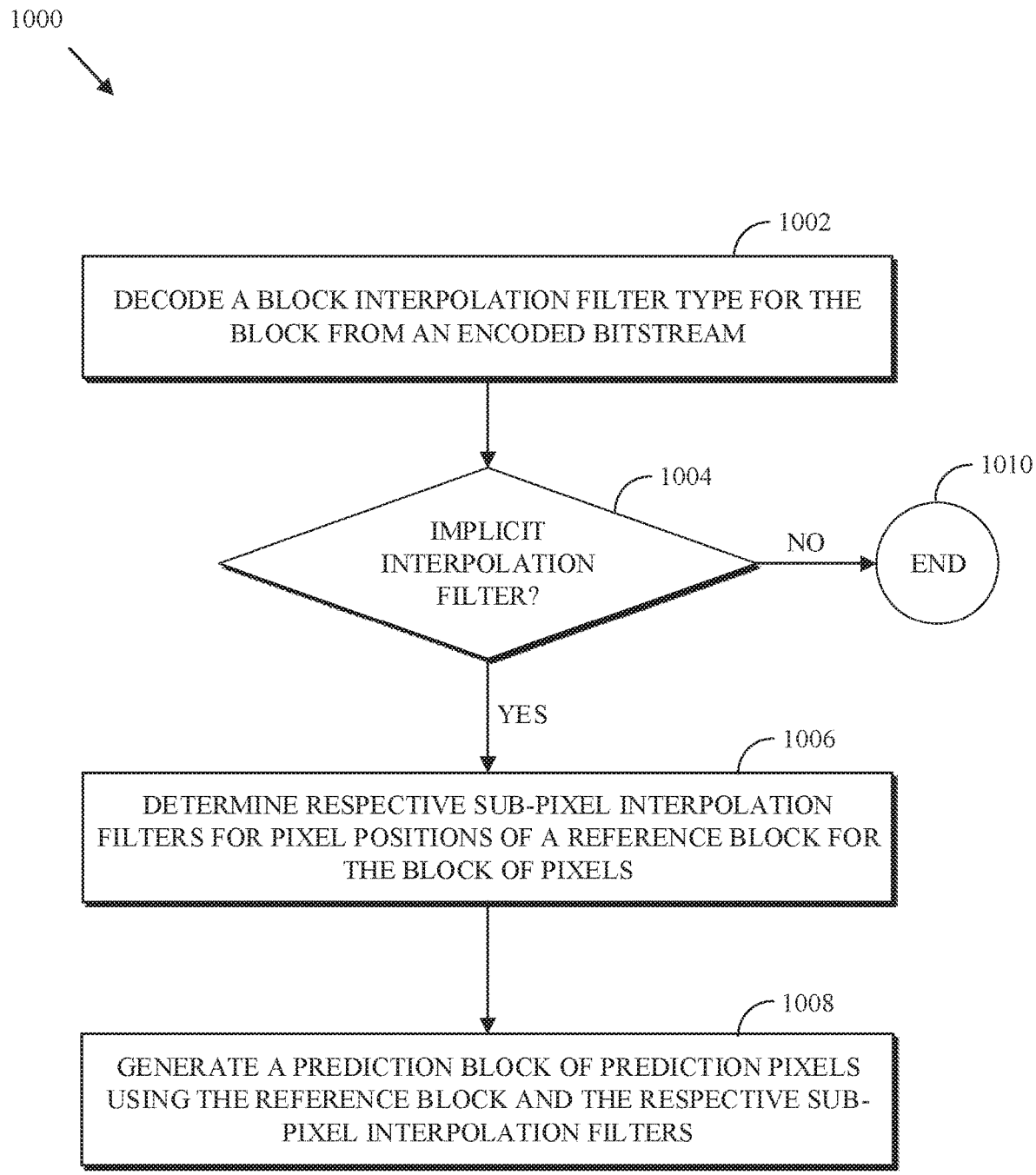
FIG. 10 is a flowchart diagram of a process for decoding using motion prediction of a block of pixels according to an implementation of this disclosure.

FIG. 10 is a flowchart diagram of a method or process 1000 for decoding using motion prediction of a block of pixels according to an implementation of this disclosure. The process 1000 may be performed by a decoder such as the decoder 500. For example, the process 1000 can be performed in whole or in part by the intra/inter-prediction stage 508 of the decoder 500. Implementations of the process 1000 can be performed by storing instructions in a memory such as the memory 204 of the receiving station 106 to be executed by a processor such as CPU 202, for example.

The process 1000 can be implemented using specialized hardware or firmware. Some computing devices can have multiple memories, multiple processors, or both. The steps or operations of the process 1000 can be distributed using different processors, memories, or both. For simplicity of explanation, the process 1000 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

At 1002, the process 1000 decodes a block interpolation filter type for the block from an encoded bitstream. The block interpolation filter type may have been encoded, by an encoder, in the header of a frame which includes the block, in the header of a coding unit which includes the block, or in the header of the block. The encoder may have encoded the block interpolation filter type in some other way.

At 1004, the process 1000 determines whether the block interpolation filter type is an implicit interpolation filter and if so, the process 1000 proceeds to 1006; otherwise the process 1000 ends at 1010. At 1006, the process 1000 determine respective sub-pixel interpolation filters for pixel positions of a reference block for the block of pixels. each sub-pixel interpolation filter for a pixel position is determined using at least one characteristic of a set of pixels of the reference block about the pixel position. The reference block can be a block of a reconstructed frame as described with respect to the reconstruction phase 510 of FIG. 5. The process 1000 can carry out the 1006 as described above with respect to 602 of the process 600 of FIG. 6. At 1010, the process 1000 generate a prediction block of prediction pixels using the reference block and the respective sub-pixel interpolation filters. The process 1000 can perform 1008 as described above with respect to 604 of the process 600 of FIG. 6.

Table 1 below illustrates the frequency with which an encoder selected the implicit interpolation filter when the described encoders were tested with the indicated test sequences. The threshold values described above, NormalThreshold and SharpThreshold, were set to five (5) and twenty-five (25) respectively.

The results show the percent number of times that each interpolation filter is selected by an encoder for the given test sequence. The column titled "Original VP9 Encoder" shows the percent number of times that each of the smooth interpolation filter, the normal interpolation filter, and the sharp interpolation filter are selected by the default VP9 encoder. For the column titled "Smooth Filter Replaced," the smooth interpolation filter of the VP9 encoder was replaced by the implicit interpolation filter described herein. For the column titled "Normal Filter Replaced," the normal interpolation filter of the VP9 encoder was replaced by the implicit interpolation filter described herein.

TABLE 1

Percent usage of filter types using NormalThreshold = 5 and SharpThreshold = 25.

| Sequence | Original VP9 Encoder | | | Smooth Filter Replaced | | | Normal Filter Replaced | | |
|---|---|---|---|---|---|---|---|---|---|
| | Smooth | Normal | Sharp | Implicit | Normal | Sharp | Smooth | Implicit | Sharp |
| Foreman | 11.8 | 46.3 | 41.8 | 50.8 | 30 | 19.2 | 6.6 | 62.2 | 31.2 |
| Calendar | 7.1 | 45.5 | 47.4 | 40.5 | 35.5 | 23.9 | 5.4 | 61.6 | 33 |
| Carphone | 48.2 | 32.4 | 19.4 | 68.4 | 22.5 | 9.1 | 30.1 | 56.2 | 13.7 |
| Parkrun | 12.1 | 46.9 | 41 | 43.5 | 32.4 | 24.1 | 8.2 | 55.1 | 36.7 |
| Coastguard | 47.0 | 35.5 | 17.5 | 36.9 | 42.4 | 20.7 | 41.8 | 39.9 | 18.3 |
| City | 5.6 | 50.7 | 43.7 | 43.6 | 30.5 | 25.9 | 1.9 | 60.9 | 37.2 |
| Crew | 24.8 | 47.4 | 27.8 | 64.1 | 27.5 | 8.3 | 11.8 | 69.2 | 19 |
| Knightshields | 7.1 | 46.3 | 46.6 | 48.8 | 29.7 | 21.4 | 3.7 | 58.1 | 38.2 |

As the data indicates, the implicit interpolation filter described herein was the most commonly selected interpolation filter by the encoder—it was selected seven out of eight times. As the implicit interpolation filter was selected (based on a rate-distortion optimization) more often than the other interpolation filters, the implicit interpolation filter is more useful than the other tested interpolation filters.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for motion prediction of a block of pixels, comprising:
generating a prediction block of prediction pixels using a reference block, wherein
the prediction pixels being at sub-pixel positions,
each prediction pixel being generated using a respective interpolation filter selected from a set of predefined sub-pixel interpolation filters,
each sub-pixel interpolation filter having a cardinality of taps, and
the generating the prediction block comprising:
for each prediction pixel of the prediction block, determining a respective interpolation filter by:
determining, for the each prediction pixel, a characteristic of a set of pixels, the set of pixels being pixels used by the sub-pixel interpolation filters and corresponding to the cardinality of taps, the characteristic including at least one of a range of values of the set of pixels, frequency domain characteristic of the set of pixels or a standard deviation of the set of pixels;
selecting, based on the characteristic, the respective interpolation filter from the set of predefined sub-pixel interpolation filters; and
determining the each prediction pixel based on the respective interpolation filter and the set of pixels.

2. The method of claim 1, wherein the set of predefined sub-pixel interpolation filters comprises at least a smooth interpolation filter, corresponding to an EIGHTTAP_SMOOTH filter type, a sharp interpolation filter, corresponding to an EIGHTTAP_SHARP filter type, and a normal interpolation filter, corresponding to an EIGHTTAP filter type.

3. The method of claim 1, wherein the prediction block is a first prediction block, the method further comprising:
determining a first prediction error for the first prediction block;
determining a second prediction error for a second prediction block, the second prediction block generated using one interpolation filter of the set of predefined sub-pixel interpolation filter for all pixels of the reference block; and
selecting a block interpolation filter corresponding to a lower prediction error of the first prediction error and the second prediction error, the block interpolation filter indicating the one interpolation filter of the set of predefined sub-pixel interpolation filters or an implicit interpolation filter.

4. The method of claim 3, further comprising:
encoding, for the block of pixels and in an encoded bitstream, an interpolation filter type corresponding to the block interpolation filter.

5. The method of claim 1, wherein the characteristic is the range and wherein determining respective sub-pixel interpolation filters comprises:
selecting a first interpolation filter responsive to the range being below a first threshold;
selecting a second interpolation filter responsive to the range exceeding the first threshold and below a second threshold; and
selecting a third interpolation filter responsive to the range exceeding the second threshold.

6. An apparatus for motion prediction of a block of pixels, the apparatus comprising:
a memory; and
a processor configured to execute instructions stored in the memory to:
determine a respective sub-pixel interpolation filter for a pixel position of a reference block for the block of pixels,
the respective sub-pixel interpolation filter being selected from a plurality of available sub-pixel interpolation filters, each having a cardinality of taps,
wherein the respective sub-pixel interpolation filter being determined using at least one characteristic of a set of pixels, the set of pixels corresponding to pixels used in interpolation operations; and
generate a prediction block of prediction pixels using the reference block and the respective sub-pixel interpolation filters.

7. The apparatus of claim 6, wherein each of the plurality of available sub-pixel interpolation filters has a corresponding frequency response.

8. The apparatus of claim 6, wherein the instructions further comprise instructions to:
determine a prediction error for the prediction block;
generate a plurality of prediction blocks for the block of pixels using the reference block, each of the plurality of prediction blocks using a different, single sub-pixel interpolation filter for each pixel position of the reference block;
determine respective prediction errors for each of the plurality of prediction blocks; and
select an interpolation filter type based on the prediction error for the prediction block and the respective prediction errors for each of the plurality of prediction blocks.

9. The apparatus of claim 8, wherein the interpolation filter type comprises an implicit interpolation filter type when the prediction error for the prediction block is smaller than the respective prediction errors for each of the plurality of prediction blocks.

10. The apparatus of claim 6, wherein the set of pixels about the prediction pixel comprises eight pixels.

11. The apparatus of claim 10, wherein the characteristic is a range of values of the set of pixels about the prediction pixel.

12. An apparatus for decoding using motion prediction of a block of pixels, the apparatus comprising:
a memory; and
a processor configured to execute instructions stored in the memory to:
decode a block interpolation filter type for the block of pixels from an encoded bitstream; and
in response to determining that the block interpolation filter type is an implicit interpolation filter type, the implicit interpolation filter indicates that a respective interpolation filter is to be determined for each pixel position of a reference block,
determine respective sub-pixel interpolation filters for pixel positions of a reference block for the block of pixels, wherein each sub-pixel interpolation filter for a pixel position is determined using at least one characteristic of a set of pixels of the reference block, the set of pixels corresponding to pixels used by the sub-pixel interpolation filters in interpolation operations, and
generate a prediction block of prediction pixels using the reference block and the respective sub-pixel interpolation filters.

13. The apparatus of claim 12, wherein the characteristic is at least one of a range of values of the set of pixels about the prediction pixel, a variance of the set of pixels about the prediction pixel, or a standard deviation of the set of pixels about the prediction pixel.

14. The apparatus of claim 12, wherein the instructions further comprise instructions to:
- in response to determining that the block interpolation filter type is other than the implicit interpolation filter type:
    - determine a single interpolation filter of a plurality of available interpolation filter types; and
    - generate the prediction block of prediction pixels using the reference block and the single interpolation filter.

* * * * *